US011551566B2

(12) United States Patent
Wiegele

(10) Patent No.: US 11,551,566 B2
(45) Date of Patent: Jan. 10, 2023

(54) POSITIONAL SYNCHRONIZATION OF TAXIING AIRCRAFT WITH GROUND SUPPORT SYSTEMS

(71) Applicant: Rosemount Aerospace Inc., Burnsville, MN (US)

(72) Inventor: Thomas G. Wiegele, Eagan, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 258 days.

(21) Appl. No.: 16/414,421

(22) Filed: May 16, 2019

(65) Prior Publication Data

US 2020/0365043 A1 Nov. 19, 2020

(51) Int. Cl.
*G08G 5/06* (2006.01)
*G01C 21/34* (2006.01)
*G08G 5/00* (2006.01)

(52) U.S. Cl.
CPC ......... *G08G 5/065* (2013.01); *G01C 21/3438* (2013.01); *G08G 5/0013* (2013.01)

(58) Field of Classification Search
CPC .. G01C 21/3438; G08G 5/0013; G08G 5/065; G08G 5/045; B64F 1/002
See application file for complete search history.

(56) References Cited

U.S. PATENT DOCUMENTS

| 9,958,867 | B2* | 5/2018 | Cox | G05D 1/0202 |
|---|---|---|---|---|
| 10,048,686 | B2* | 8/2018 | Brekke | G01C 21/20 |
| 10,074,285 | B2* | 9/2018 | Depape | G01C 21/3626 |
| 2017/0032687 | A1* | 2/2017 | Lamkin | G08G 5/0082 |
| 2019/0080622 | A1* | 3/2019 | Gros | G08G 5/065 |
| 2020/0331630 | A1* | 10/2020 | Ricaud | B64C 25/405 |

* cited by examiner

*Primary Examiner* — Sze-Hon Kong
*Assistant Examiner* — Ana D Thomas
(74) *Attorney, Agent, or Firm* — Kinney & Lange, P.A.

(57) ABSTRACT

Apparatus and associated methods relate to synchronization of a ground support vehicle with a taxiing aircraft, so as to provide ground support services during taxi operation. After landing, a taxiing aircraft obtains a parking destination from a ground traffic controller. A first navigational route from a first location of the taxiing aircraft to the parking destination is determined. The taxiing aircraft transmits a signal indicative of the first navigational route to the ground support vehicle. A second navigational route of the ground support vehicle is determined so as to intercept the taxiing aircraft. The ground support vehicle navigates according to the determined second navigational route, and couples to the taxiing aircraft at a coupling location common to both the first and the second navigational routes. The ground support vehicle provides ground support service during continued navigation according to a coupled portion of the first navigational route.

20 Claims, 4 Drawing Sheets

POSITIONAL SYNCHRONIZATION OF TAXIING AIRCRAFT WITH GROUND SUPPORT SYSTEMS

BACKGROUND

Airlines are under constant pressure to reduce gate turn-around times, to improve capacity and performance, and to increase profits. Many ground support operations must be performed, some sequentially, between legs of a flight. For example, some such ground support operations include refueling, baggage handling, de-icing, cabin cleaning and resupplying, data downloading, etc. Furthermore, because of the size of international airports, taxiing between gates and runways can consume a significant amount of time. Methods for reducing the time required for these ground operations could provide better service, as well as produce higher profits.

SUMMARY

Apparatus and associated methods relate to a method for synchronizing a taxiing aircraft with a ground support vehicle. A first navigational route from a current location of the taxiing aircraft to a parking destination is determined. Then, the taxiing aircraft navigates according to the determined first navigational route. The taxiing aircraft transmits a signal indicative of the first navigational route to the ground support vehicle. Then, the taxiing aircraft couples with a ground support vehicle at a coupling location. The ground support vehicle navigated to the coupling location according to a second navigational route that intercepts the first navigational route at the coupling location common to both the first and the second navigational routes. Then, ground support services are provided by the ground support vehicle to the taxiing aircraft during continued navigation according to a coupled portion of the first navigational route.

Some embodiments relate to a system for synchronizing a ground support vehicle with a taxiing aircraft. The system includes a taxi transponder, an autonomous taxi system, one or more processors and computer readable memory, the taxi transponder is configured to transmit a first navigational route to the ground support vehicle. The autonomous taxi system is configured to navigate the taxiing aircraft according to a navigational path. The computer-readable memory is encoded with instructions that, when executed by the one or more processors, cause the system to determine a first navigational route from an aircraft location to the parking destination. The computer-readable memory is further encoded with instructions that, when executed by the one or more processors, cause the system to navigate the taxiing aircraft according to the determined first navigational route. The computer-readable memory is further encoded with instructions that, when executed by the one or more processors, cause the system to transmit, from the taxiing aircraft to the ground support vehicle, a signal indicative of the first navigational route. The computer-readable memory is further encoded with instructions that, when executed by the one or more processors, cause the system to couple the taxiing aircraft with a ground support vehicle that is navigating according to a second navigational route that intercepts the first navigational route at a coupling location common to both the first and the second navigational routes. The computer-readable memory is further encoded with instructions that, when executed by the one or more processors, cause the system to receive ground support services provided by the ground support vehicle to the taxiing aircraft during continued navigation according to a coupled portion of the first navigational route.

DETAILED DESCRIPTION

Apparatus and associated methods relate to synchronization of a ground support vehicle with a taxiing aircraft, so as to provide ground support services during taxi operation. After landing, a taxiing aircraft obtains a parking destination from a ground traffic controller. A first navigational route from a first location of the taxiing aircraft to the parking destination is determined. The taxiing aircraft transmits a signal indicative of the first navigational route to the ground support vehicle, or ground support vehicle's Ground Control function. A second navigational route of the ground support vehicle is determined so as to intercept the taxiing aircraft. The ground support vehicle navigates according to the determined second navigational route, and couples to the taxiing aircraft at a coupling location common to both the first and the second navigational routes. The ground support vehicle provides ground support service during continued navigation according to a coupled portion of the first navigational route.

Figure 1:
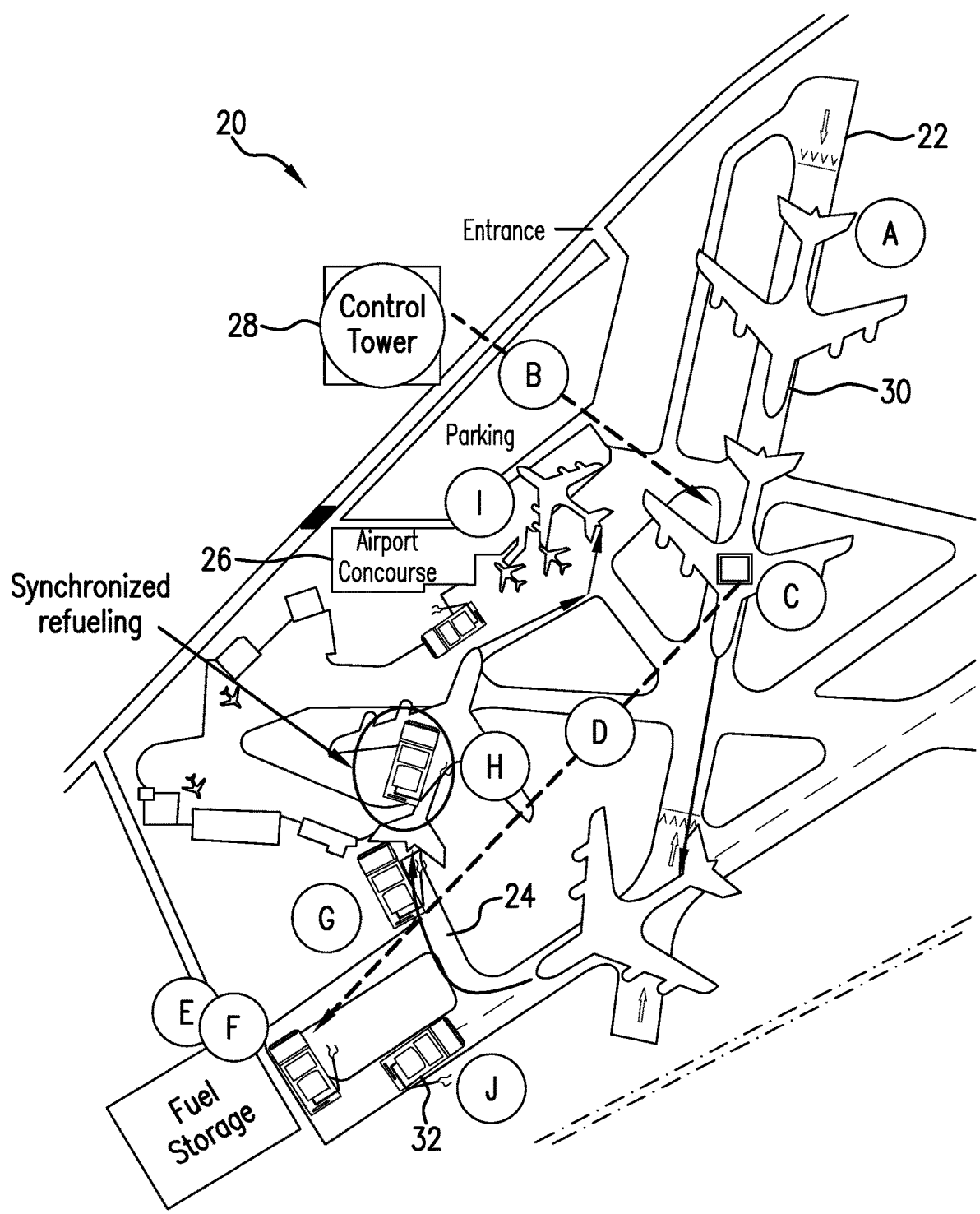
FIG. 1 is a plan view of an airport with locations where various ground operations can be performed during taxiing of an aircraft.

FIG. 1 is a plan view of an airport with locations where various ground operations can be performed during taxiing of an aircraft. In FIG. 1, airport 20 includes runway 22, taxiway 24, concourse 26, and control tower 28. Aircraft 30 and ground support vehicle 32 are shown at various locations corresponding to various times during which ground operations can be conducted. Also annotated in FIG. 1 are reference designators (A)-(J) which indicate where specific ground operations can be conducted, some of which are conducted while aircraft 30 is taxiing to a designated parking location. Aircraft 30 lands (A) on runway 22. Control tower 28 transmits (B) gate information to aircraft 30 after landing. Then, aircraft 30 computes (C) an auto-taxi route from a current aircraft location (e.g., based on GPS determined location) to the gate corresponding to the gate information transmitted to aircraft 30. In some embodiments, the auto-taxi route can be determined by control tower 28 and transmitted to aircraft 30.

Taxiing aircraft 30 can transmit (D) a signal indicative of the computed auto-taxi route to ground support equipment, such as refueling vehicle 32 depicted in the figure. In some embodiments, taxiing aircraft 30 can also transmit (D) a signal indicative of a current location of taxiing aircraft 30. In some embodiments, such as those in which control tower 28 determines the auto-taxi route, control tower 28 can transmit (D) the signal indicative of the computed auto-taxi route to refueling vehicle 32. Refueling vehicle 32 receives (E) the signal indicative of the auto-route via a taxi transponder exchange. In some circumstances, refueling vehicle 32 might be parked at a stand-by location. In some circumstances, refueling vehicle 32 might be in transit from a previous refueling engagement.

Refueling vehicle 32 determines (F) a navigational route so as to engage taxiing aircraft 30 during taxi operation. In some embodiments, refueling vehicle 32 can determine (F) the navigational route based on the received auto-taxi route and a current location of taxiing aircraft 30. Refueling vehicle 32 navigates according to the determined navigational route and intercepts taxiing aircraft 30. At the location of interception, refueling vehicle 32 positions (G) itself so as to couple to taxiing aircraft 30, while aircraft 30 continues to taxi. After positioned alongside taxiing aircraft 30, vehicle 32 then couples (H) to taxiing aircraft 30. While coupled, taxiing aircraft 30 and refueling vehicle 32 continue along the determined auto-route, which refueling vehicle 32 refuels taxiing aircraft 30.

After refueling is complete, either while still taxiing or after aircraft 30 is parked, ground support vehicle 32 decouples (I) from aircraft 30 and either returns to a standby location, a fuel storage location, or along another route calculated to engage another taxiing aircraft. If returning to the fuel storage location, refueling vehicle 32 can be resupplied (J) with fuel. In some embodiments, one or both of taxiing aircraft 30 and refueling vehicle 32 can have an auto-taxi mode, in which a human driver need not control the navigation of the vehicle.

Although FIG. 1 depicts ground support vehicle 32 as a refueling vehicle. Various other ground support vehicles can be configured so as to provide other types of ground support during the taxiing of aircraft 30. For example, in addition to refueling aircraft 30, baggage handling operations can be conducted, de-icing of aircraft 30 can be performed, cabin cleaning and resupplying can be conducted, downloading of various aircraft data can be performed, etc.

Figure 2:
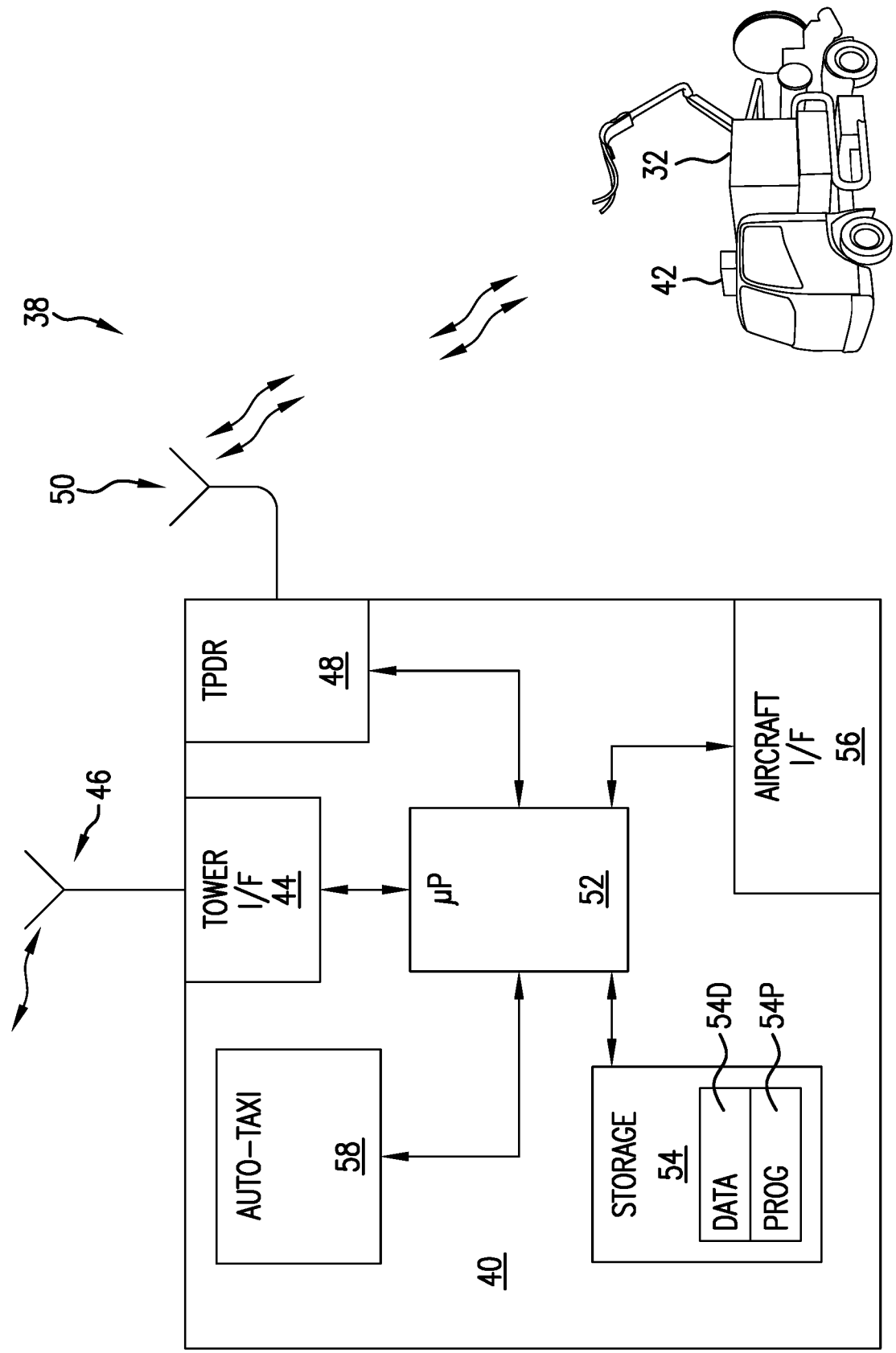
FIG. 2 is a block diagram of a system for synchronizing a ground support vehicle with a taxiing aircraft.

FIG. 2 is a block diagram of a system for synchronizing a ground support vehicle with a taxiing aircraft. In FIG. 2, system 38 includes aircraft taxi coordination system 40 facilitating coordination of ground support services with ground support vehicle 32. Ground support vehicle 32 includes ground support taxi coordination system 42, which has many of the same components and capabilities as aircraft taxi coordination system 40. Aircraft taxi coordination system 40 includes control tower interface 44, tower communications antenna 46, taxi transponder 48, taxi transponder antenna 50, processor(s) 52, storage 54, aircraft interface 56, and auto-taxi navigation controller 58. Aircraft taxi coordination system 40 can be configured to be mountable to an aircraft.

Processor(s) 52 can receive program instructions from program memory 54P. Processor(s) 52 can then execute program instructions to control system 40 so as to communicate with the control power, communicate with ground control vehicle 32, determine a taxi navigation route, perform automatic navigation along the determined route, coordinate ground support services with ground support vehicle 32, etc. Processor(s) 52 can store and retrieve data from data memory 54D. For example, processor(s) 52 can retrieve airport layout data from data memory 54D, can log any data regarding the taxiing of the aircraft or ground support services that occur during taxi operations, and can receive information related to ground support services (e.g., available fuel at storage facility, availability and location of baggage handling equipment, etc.).

Processor(s) 52, in one example, is configured to implement functionality and/or process instructions for execution within system 40. For instance, processor(s) 52 can be capable of processing instructions stored in program memory 54P. Examples of processor(s) 52 can include any one or more of a microprocessor, a controller, a digital signal processor (DSP), an application specific integrated circuit (ASIC), a field-programmable gate array (FPGA), or other equivalent discrete or integrated logic circuitry. In some embodiments, processor(s) 52 can be remotely located, such as, for example, in the Cloud.

Memory 54 can be configured to store information within system 40 during operation. Memory 54, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 54 is a temporary memory, meaning that a primary purpose of memory 54 is not long-term storage. Memory 48, in some examples, is described as volatile memory, meaning that memory 54 do not maintain stored contents when power to system 40 is turned off. Examples of volatile memories can include random access memories (RAM), dynamic random access memories (DRAM), static random access memories (SRAM), and other forms of volatile memories. In some examples, memory 48 is used to store program instructions for execution by processor(s) 52. Memory 54, in one example, is used by software or applications running on system 40 (e.g., a software program implementing calculations of cloud atmosphere metrics) to temporarily store information during program execution, such as, for example, in data memory 54D.

In some examples, memory 54 can also include one or more computer-readable storage media. Memory 54 can be configured to store larger amounts of information than volatile memory. Memory 54 can further be configured for long-term storage of information. In some examples, memory 54 includes non-volatile storage elements. Examples of such non-volatile storage elements can include magnetic hard discs, optical discs, flash memories, or forms of electrically programmable memories (EPROM) or electrically erasable and programmable (EEPROM) memories. In some embodiments, memory 54 can be virtual, as being located in the Cloud.

Tower interface 44 can be used to communicate information between system 40 and a control tower (e.g., via tower communications antenna 46). In some embodiments, such information can include aircraft conditions, atmospheric conditions, runway traffic conditions, taxiway traffic status, ground support information, etc. In some embodiments, such information can include data processed by system 40, such as, for example, ground support needs. Tower interface 44 can also include a communications module. Tower interface 44, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, Cellular (3G, 4G, 5G, etc.), SatCom, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Taxi transponder 48 can be used to communicate information between system 40 and ground support vehicles (e.g., via transponder antenna 50), such as ground support vehicle 32. In some embodiments, such information can include aircraft location, aircraft navigational route, ground support vehicle location, ground support vehicle navigational route, runway/taxiway traffic conditions, ground support information, etc. Like tower interface 44, Taxi transponder 48 can also include a communications module. Taxi transponder 48, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, Cellular (3G, 4G, 5G, etc.), SatCom, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Aircraft interface 56 can be used to communicate information between system 40 and the aircraft on which system 40 resides. In some embodiments, such information can include aircraft navigational routes, aircraft taxi metrics (e.g., speed, turning radius, image data, etc.), etc. Aircraft interface 56 can also include a communications module. Aircraft interface 56, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, Cellular (3G, 4G, 5G, etc.), SatCom, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Auto-taxi navigation controller 58 can receive image data and determine tactical and strategic navigational responses to the received image data. For example, auto-taxi navigational computer 58 can identify features in the received image data, such as painted markings, sign indicators, objects external to the aircraft, parking indicia, etc. Auto-taxi navigational computer 58 can then determine corrective actions, such as velocity, turning radius, braking applications, etc.

Figure 3:
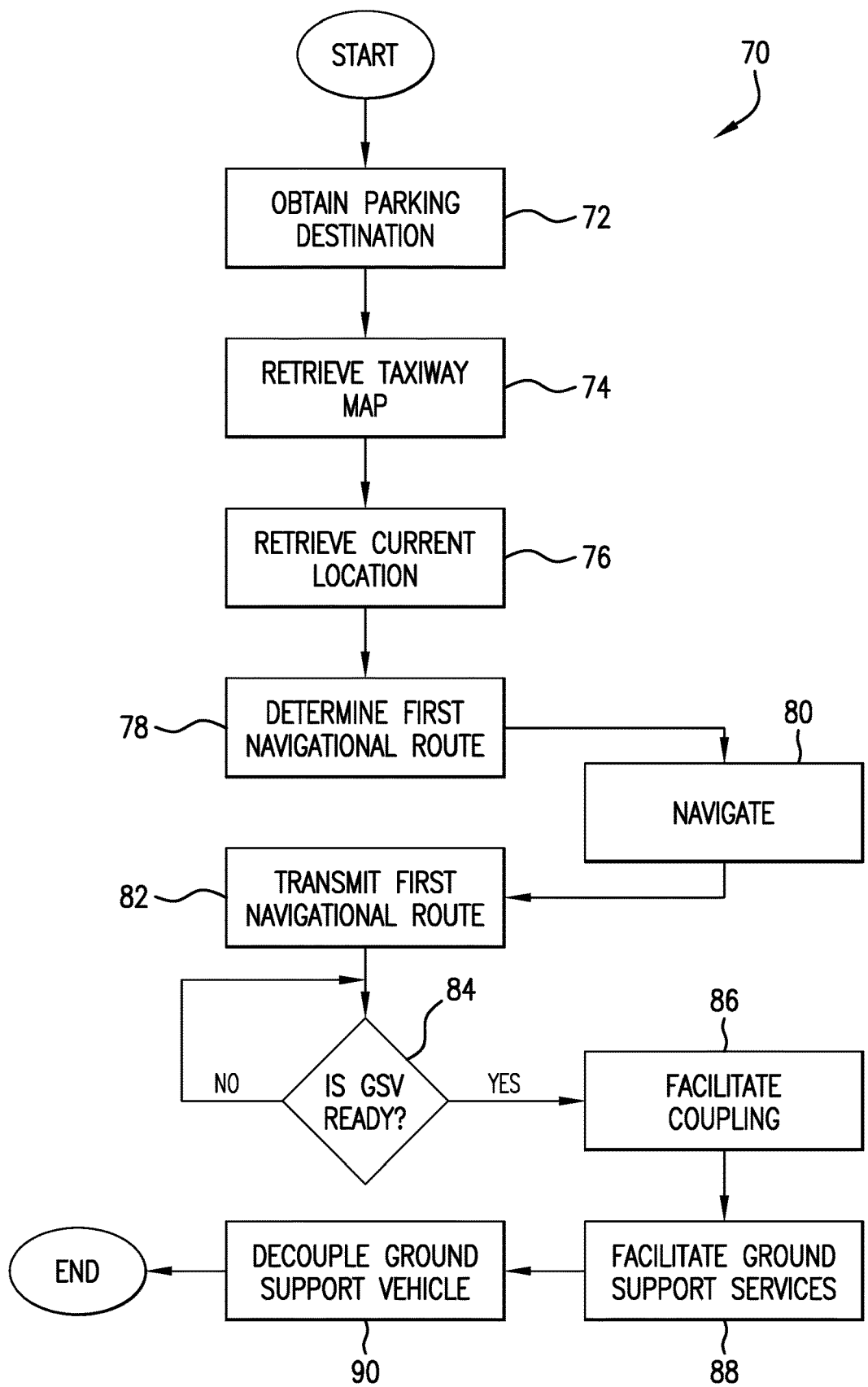
FIG. 3 is a flowchart of a method for synchronizing a ground support vehicle with a taxiing aircraft.

FIG. 3 is a flowchart of a method for synchronizing a ground support vehicle with a taxiing aircraft. FIG. 3 depicts such a method from the vantage point of a taxiing aircraft. In FIG. 3, method 70 begins at step 72, in which aircraft taxi coordination system 40 (depicted in FIG. 2), obtains parking destination. Such parking destination information can be a gate number, or a GPS coordinate, etc. Then, at step 74, aircraft taxi coordination system 40 retrieves a taxiway map (e.g., from data memory 54D), for use in determining a navigational route to the obtained parking destination. At step 76, aircraft taxi coordination system 40 retrieves a current location of the taxiing aircraft (e.g., via aircraft I/F 56 depicted in FIG. 2). At step 78, aircraft taxi coordination system 40 determines a first navigational route from the retrieved current location of the taxiing aircraft to the obtained parking destination.

At step 80, aircraft taxi coordination system 40 navigates the taxiing aircraft according to the determined first navigational route (e.g., using auto-taxi navigational computer 58 depicted in FIG. 2). Then at step 82, aircraft taxi coordination system 40 transmits a signal indicative of the determined first navigational route to a ground support vehicle (e.g., using taxi transponder 48 depicted in FIG. 2). At step 82, aircraft taxi coordination system 40 waits until the ground support vehicle is ready to couple to the aircraft. If, at step 82, the ground support vehicle is not ready to couple to the aircraft, method 70 returns to step 82 and aircraft taxi coordination system 40 continues to wait. While aircraft taxi coordination system 40 waits, the aircraft continues taxiing. If, however, at step 82, the ground support vehicle is not ready to couple to the aircraft, method 70 continues to step 84, in which aircraft taxi coordination system 40 facilitates coupling of aircraft and ground support vehicle. Such facilitation can include providing control signals to the aircraft via aircraft interface 56, operating coupling/uncoupling mechanism(s), coordinating position of aircraft with respect to the ground support vehicle, and/or providing signals indicative of position, navigational route, etc. to the ground support vehicle, for example. For example, for a refueling operation, coupling of a refueling vehicle to the taxiing aircraft can include fluidically attaching the refueling vehicle to the taxiing aircraft. For a baggage transfer operation, coupling of a baggage transfer vehicle to the taxiing aircraft can include mechanically coupling the baggage transfer vehicle to the taxiing aircraft or simply synchronizing the navigation of the baggage transfer vehicle with the taxiing aircraft such that the two vehicles travel in close proximity to one another and at the same velocity relative to one another.

At step 86, aircraft taxi coordination system 40 facilitates ground support operations. Such facilitation, for example, can be to coordinate taxi operations with the ground support vehicle, or control of other aircraft actuators. Then, at step 88, after ground support services have been completed, aircraft taxi coordination system 40 facilitates decoupling with the ground support vehicle, and then method 70 ends. In some embodiments, aircraft taxi coordination system 40 subsequently executes a method for synchronizing with another ground support vehicle is performed.

Figure 4:
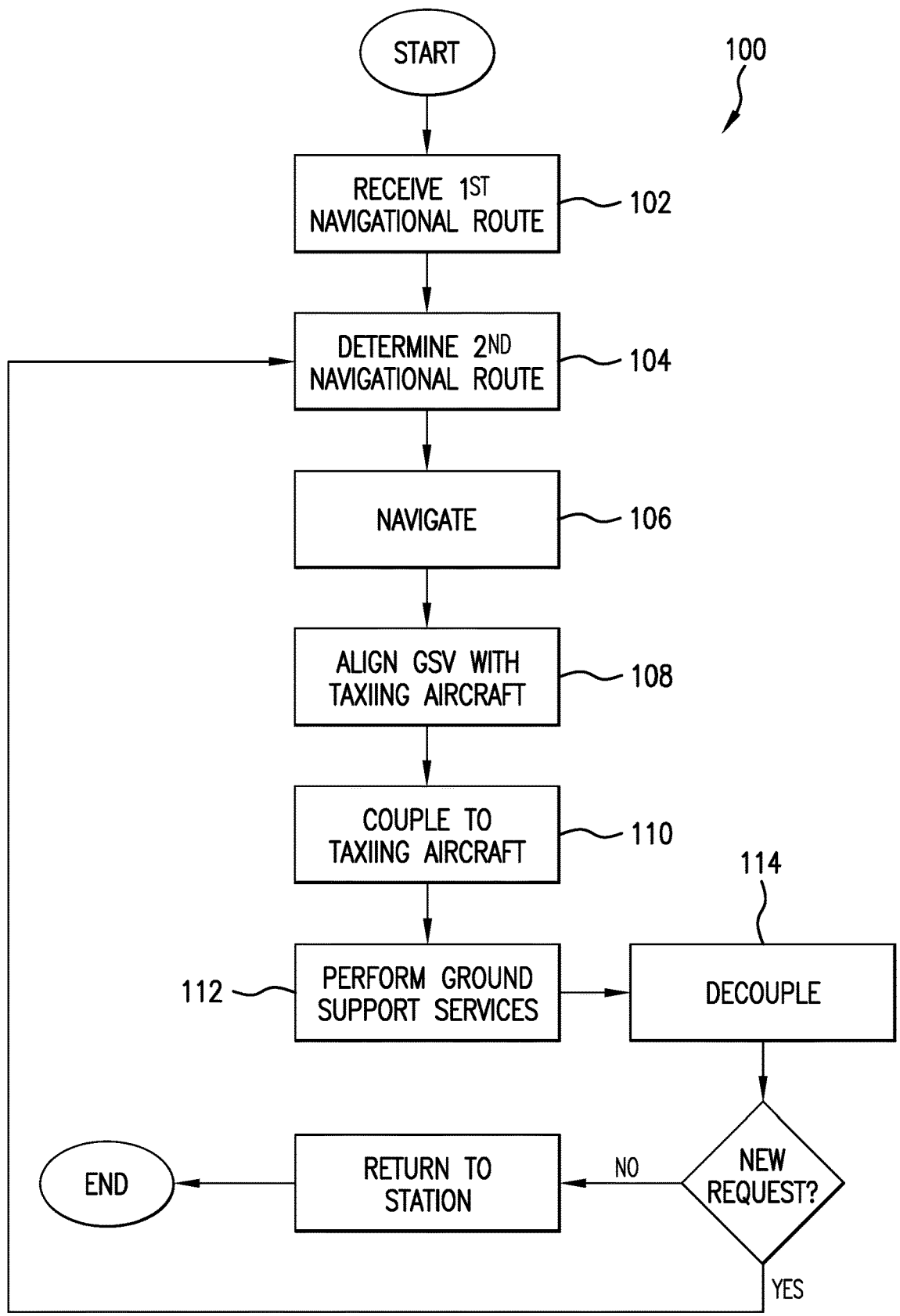
FIG. 4 is a flowchart of a method for synchronizing a ground support vehicle with a taxiing aircraft.

FIG. 4 is a flowchart of a method for synchronizing a ground support vehicle with a taxiing aircraft. FIG. 4 depicts such a method from the vantage point of a ground support vehicle. In FIG. 4, method 100 begins at step 102, in which ground vehicle coordination system 42 (depicted in FIG. 2), receives a first navigational route and/or location of a taxiing aircraft. Then, at step 104, ground vehicle coordination system 42 determines a second navigational route from a current location of the ground support vehicle and intercepting the first navigational route.

At step 106, ground vehicle coordination system 42 navigates the ground support vehicle according to the determined second navigational route (e.g., using an auto-taxi navigational computer, such as auto-taxi navigational computer depicted in FIG. 2). Then at step 108, ground vehicle coordination system 42 aligns the ground support vehicle with the taxiing aircraft so as to prepare for coupling. At step

110, ground vehicle coordination system 42 couples to the taxing aircraft. Then at step 112, ground vehicle coordination system 42 facilitates ground support services. After ground support services have been completed, at step 114, ground vehicle coordination system 42 facilitates decoupling of the ground support vehicle from the taxiing aircraft. Such facilitation can include providing control signals to the aircraft via aircraft interface 56, operating coupling/uncoupling mechanism(s), coordinating position of aircraft with respect to the ground support vehicle, and/or providing signals indicative of position, navigational route, etc. to the ground support vehicle Method 100 then proceeds to step 116, in which ground vehicle coordination system 42 determines if a new request for ground services has been received from another taxiing aircraft. If, at step 116, no new request for ground services has been received, method 100 advances to step 118, in which ground vehicle coordination system 42 facilitates navigation of the ground support vehicle to its standby location or station. If, however, at step 116, a new request for ground services has been received, method 100 returns to step 104, in which ground vehicle coordination system 42 determines a new second navigational route from a current location of the ground support vehicle and intercepting the first navigational route Discussion of Possible Embodiments The following are non-exclusive descriptions of possible embodiments of the present invention.

Apparatus and associated methods relate to a method for synchronizing a taxiing aircraft with a ground support vehicle. The method includes determining a first navigational route from a current location of the taxiing aircraft to a parking destination. The method includes navigating the taxiing aircraft according to the determined first navigational route. The method includes transmitting, from the taxiing aircraft to the ground support vehicle, a signal indicative of the first navigational route. The method includes coupling of the taxiing aircraft with the ground support vehicle that is navigating according to a second navigational route that intercepts the first navigational route at a coupling location common to both the first and the second navigational routes. The method also includes receiving ground support services provided by the ground support vehicle to the taxiing aircraft during continued navigation according to a coupled portion of the first navigational route.

The method of the preceding paragraph can optionally include, additionally and/or alternatively, any one or more of the following features, configurations and/or additional components:

A further embodiment of the foregoing method can further include obtaining the parking destination from a ground traffic controller.

A further embodiment of any of the foregoing methods can further include decoupling of the taxiing aircraft from the ground support vehicle.

A further embodiment of any of the foregoing methods can further include determining a second navigational route from current location of the ground support vehicle and intercepting the first navigational route. The method can further include navigating the ground support vehicle according to the determined second navigational route. The method can further include providing, by the ground support vehicle, a ground support service during the continued navigation according to the coupled portion of the first navigational route.

A further embodiment of any of the foregoing methods can further include determining a third navigational route from the ground support vehicle location after decoupling from the taxiing aircraft to a destination location for the ground support vehicle.

A further embodiment of any of the foregoing methods, wherein the destination location can be a designated standby location for the ground support vehicle.

A further embodiment of any of the foregoing methods, wherein the taxiing aircraft can be a first taxiing aircraft, and wherein the third navigational path can intercept a fourth navigational path of a second taxiing aircraft.

A further embodiment of any of the foregoing methods can further include updating the first navigational route in response to ground traffic interference.

A further embodiment of any of the foregoing methods can further include transmitting, from the taxiing aircraft to the ground support vehicle, a signal indicative of the updated first navigational route.

A further embodiment of any of the foregoing methods can further include receiving, from the ground support vehicle, a signal indicative of the second navigational route.

Some embodiments relate to a system for synchronizing a ground support vehicle with a taxiing aircraft. The system includes a taxi transponder configured to transmit a first navigational route to the ground support vehicle. The system includes an autonomous taxi system configured to navigate the taxiing aircraft according to a navigational path. The system includes one or more processors. The system also includes computer-readable memory encoded with instructions that, when executed by the one or more processors, cause the system to determine a first navigational route from an aircraft location to the parking destination. The computer-readable memory in further encoded with instructions that, when executed by the one or more processors, cause the system to navigate the taxiing aircraft according to the determined first navigational route. The computer-readable memory in further encoded with instructions that, when executed by the one or more processors, cause the system to transmit, from the taxiing aircraft to the ground support vehicle, a signal indicative of the first navigational route. The computer-readable memory in further encoded with instructions that, when executed by the one or more processors, cause the system to couple the taxiing aircraft with a ground support vehicle that is navigating according to a second navigational route that intercepts the first navigational route at a coupling location common to both the first and the second navigational routes. The computer-readable memory in further encoded with instructions that, when executed by the one or more processors, cause the system to receive ground support services provided by the ground support vehicle to the taxiing aircraft during continued navigation according to a coupled portion of the first navigational route.

The system of the preceding paragraph can optionally include, additionally and/or alternatively, any one or more of the following features, configurations and/or additional components:

A further embodiment of the foregoing system, wherein the computer-readable memory can be further encoded with instructions that, when executed by the one or more processors, cause the system to obtain a parking destination from a ground traffic controller.

A further embodiment of any of the foregoing systems, wherein the computer-readable memory can be further encoded with instructions that, when executed by the one or more processors, cause the system to decouple the taxiing aircraft from the ground support vehicle A further embodiment of any of the foregoing systems, wherein the computer-readable memory can be further encoded with instructions that, when executed by the one or more processors, cause the system to determine a second navigational route from current location of the ground support vehicle and intercepting the first navigational route. The computer-readable memory can be further encoded with instructions that, when executed by the one or more processors, cause the system to navigate the ground support vehicle according to the determined second navigational route. The computer-readable memory can be further encoded with instructions that, when executed by the one or more processors, cause the system to provide, by the ground support vehicle, a ground support service during the continued navigation according to the coupled portion of the first navigational route.

A further embodiment of any of the foregoing systems, wherein the computer-readable memory can be further encoded with instructions that, when executed by the one or more processors, cause the system to determine a third navigational route from the ground support vehicle location after decoupling from the taxiing aircraft to a destination location for the ground support vehicle.

A further embodiment of any of the foregoing systems, wherein the destination location is a designated standby location for the ground support vehicle.

A further embodiment of any of the foregoing systems, wherein the taxiing aircraft is a first taxiing aircraft, and wherein the third navigational path intercepts a fourth navigational path for a second taxiing aircraft.

A further embodiment of any of the foregoing systems, wherein the computer-readable memory can be further encoded with instructions that, when executed by the one or more processors, cause the system to update the first navigational route in response to ground traffic interference.

A further embodiment of any of the foregoing systems, wherein the computer-readable memory can be further encoded with instructions that, when executed by the one or more processors, cause the system to transmit, from the taxiing aircraft to the ground support vehicle, a signal indicative of the updated first navigational route.

A further embodiment of any of the foregoing systems, wherein the computer-readable memory can be further encoded with instructions that, when executed by the one or more processors, cause the system to receive, from the ground support vehicle, a signal indicative of the second navigational route.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for synchronizing a taxiing aircraft with a ground support vehicle, the method comprising:
   determining a first navigational route from a current location of the taxiing aircraft to a parking destination;
   navigating the taxiing aircraft according to the determined first navigational route;
   transmitting, from the taxiing aircraft to the ground support vehicle, a signal indicative of the first navigational route;
   coupling of the taxiing aircraft with the ground support vehicle that is navigating according to a second navigational route that intercepts the first navigational route at a coupling location common to both the first and the second navigational routes, wherein such coupling is performed while the taxiing aircraft continues to taxi and the ground support vehicle is traveling in close proximity to and at the same velocity as the taxiing aircraft, such that the aircraft and the ground support vehicle go from an uncoupled state to a coupled state while the aircraft is taxiing; and
   receiving ground support services provided by the ground support vehicle to the taxiing aircraft during continued navigation according to a coupled portion of the first navigational route.

2. The method of claim 1, further comprising:
   obtaining the parking destination from a ground traffic controller.

3. The method of claim 1, further comprising:
   decoupling of the taxiing aircraft from the ground support vehicle.

4. The method of claim 1, further comprising:
   determining a second navigational route from current location of the ground support vehicle and intercepting the first navigational route;
   navigating the ground support vehicle according to the determined second navigational route; and
   providing, by the ground support vehicle, a ground support service during the continued navigation according to the coupled portion of the first navigational route.

5. The method of claim 4, further comprising:
   determining a third navigational route from the ground support vehicle location after decoupling from the taxiing aircraft to a destination location for the ground support vehicle.

6. The method of claim 5, wherein the destination location is a designated standby location for the ground support vehicle.

7. The method of claim 5, wherein the taxiing aircraft is a first taxiing aircraft, and wherein the third navigational path intercepts a fourth navigational path of a second taxiing aircraft.

8. The method of claim 1, further comprising:
   updating the first navigational route in response to ground traffic interference.

9. The method of claim 8, further comprising:
   transmitting, from the taxiing aircraft to the ground support vehicle, a signal indicative of the updated first navigational route.

10. The method of claim 1, further comprising:
    receiving, from the ground support vehicle, a signal indicative of the second navigational route.

11. A system for synchronizing a ground support vehicle with a taxiing aircraft, the system comprising:
    a taxi transponder configured to transmit a first navigational route to the ground support vehicle;
    an autonomous taxi system configured to navigate the taxiing aircraft according to a navigational path;
    one or more processors; and
    computer-readable memory encoded with instructions that, when executed by the one or more processors, cause the system to:

determine a first navigational route from an aircraft location to the parking destination;

navigate the taxiing aircraft according to the determined first navigational route;

transmit, from the taxiing aircraft to the ground support vehicle, a signal indicative of the first navigational route;

couple the taxiing aircraft with a ground support vehicle that is navigating according to a second navigational route that intercepts the first navigational route at a coupling location common to both the first and the second navigational routes, wherein such coupling is performed while the taxiing aircraft continues to taxi and the ground support vehicle is traveling in close proximity to and at the same velocity as the taxiing aircraft, such that the aircraft and the ground support vehicle go from an uncoupled state to a coupled state while the aircraft is taxiing; and receive ground support services provided by the ground support vehicle to the taxiing aircraft during continued navigation according to a coupled portion of the first navigational route.

12. The system of claim 11, wherein the computer-readable memory is further encoded with instructions that, when executed by the one or more processors, cause the system to:

obtain a parking destination from a ground traffic controller.

13. The system of claim 11, wherein the computer-readable memory is further encoded with instructions that, when executed by the one or more processors, cause the system to:

decouple the taxiing aircraft from the ground support vehicle.

14. The system of claim 11, wherein the computer-readable memory is further encoded with instructions that, when executed by the one or more processors, cause the system to:

determine a second navigational route from current location of the ground support vehicle and intercepting the first navigational route;

navigate the ground support vehicle according to the determined second navigational route; and provide, by the ground support vehicle, a ground support service during the continued navigation according to the coupled portion of the first navigational route.

15. The system of claim 14, wherein the computer-readable memory is further encoded with instructions that, when executed by the one or more processors, cause the system to:

determine a third navigational route from the ground support vehicle location after decoupling from the taxiing aircraft to a destination location for the ground support vehicle.

16. The system of claim 15, wherein the destination location is a designated standby location for the ground support vehicle.

17. The system of claim 15, wherein the taxiing aircraft is a first taxiing aircraft, and wherein the third navigational path intercepts a fourth navigational path for a second taxiing aircraft.

18. The system of claim 11, wherein the computer-readable memory is further encoded with instructions that, when executed by the one or more processors, cause the system to:

update the first navigational route in response to ground traffic interference.

19. The system of claim 18, wherein the computer-readable memory is further encoded with instructions that, when executed by the one or more processors, cause the system to:

transmit, from the taxiing aircraft to the ground support vehicle, a signal indicative of the updated first navigational route.

20. The system of claim 11, wherein the computer-readable memory is further encoded with instructions that, when executed by the one or more processors, cause the system to: receive, from the ground support vehicle, a signal indicative of the second navigational route.

* * * * *